United States Patent
Hawkins et al.

[11] Patent Number: 6,016,403
[45] Date of Patent: *Jan. 18, 2000

[54] STATE MACHINE DESIGN FOR GENERATING EMPTY AND FULL FLAGS IN AN ASYNCHRONOUS FIFO

[75] Inventors: Andrew L. Hawkins; Pidugu L. Narayana, both of Starkville, Miss.

[73] Assignee: Cypress Semiconductor Corp., San Jose, Calif.

[ * ] Notice: This patent is subject to a terminal disclaimer.

[21] Appl. No.: 08/911,132

[22] Filed: Aug. 14, 1997

Related U.S. Application Data

[63] Continuation of application No. 08/567,893, Dec. 6, 1995, Pat. No. 5,712,992.

[51] Int. Cl.$^7$ ...................................................... G06F 12/00
[52] U.S. Cl. ............................................................... 395/877
[58] Field of Search ............................. 395/877; 365/46, 365/93, 189.12, 221

[56] References Cited

U.S. PATENT DOCUMENTS

| | | |
|---|---|---|
| 4,467,443 | 8/1984 | Shima . |
| 4,802,122 | 1/1989 | Auvinen et al. . |
| 4,833,651 | 5/1989 | Seltzer et al. . |
| 4,839,866 | 6/1989 | Ward et al. . |
| 4,847,812 | 7/1989 | Lodhi . |

(List continued on next page.)

FOREIGN PATENT DOCUMENTS

| | | |
|---|---|---|
| 1113996 | 5/1989 | Japan . |
| 676559 | 3/1994 | Japan . |

OTHER PUBLICATIONS

K. Kittrell, 4Kx9X2 Asynchronous FIFOs SN74ACT2235 and SN74ACT2236, Sep. 1995, 1–3, 5–9.

Andrew Hawkins et al., U.S.S.N. 08/567,918 State Machine Design for Generating Half–Full and Half–Empty Flags in an Asynchronous FIFO, filed Dec. 6, 1995.

Andrew Hawkins et al., U.S.S.N. 08/577,712 Circuit for Generating Almost Full and Almost Empty Flags in Asynchronous FIFOS, Filed Dec. 22, 1995.

Andrew Hawkins et al., U.S.S.N. 08/578,209 Programmable Read–Write Word Line Equality Signal Generation for FIFOS, filed Dec. 29, 1995.

Pidugu Narayana et al., U.S.S.N. 08/615,718 Signal Generation Decoder Circuit and Method, filed Mar. 13, 1996.

Pidugu Narayana et al., U.S.S.N. 08/666,751 Half–Full Flag Generator for Synchronous FIFOS. filed Aug. 2, 1996.

P. Forstner, FIFOs With a Word Width of One Bit, First–In, First–Out Technology, Mar. 1996, pp. 1–24.

T. Jackson, FIFO Memories: Solution to Reduce FIFO Metastability, First–In, First–Out Technology, Mar. 1996, pp. 1–6.

T. Jackson, Advanced Bus–Matching/Byte–Swapping Features for Internetworking FIFO Applications, Mar. 1996, pp. 1–3, 5–12.

(List continued on next page.)

*Primary Examiner*—William M. Treat
*Attorney, Agent, or Firm*—Christopher P. Maiorana; Maiorana & Acosta, P.C.

[57] ABSTRACT

A state machine for generating a flag that represents the fullness of a FIFO buffer is disclosed. The present invention generates a set of next state variables that are derived generally from a combination of three previous state variables and three additional inputs representing an internally generated look-ahead flag, an external write clock and an external read clock. The next state variables are derived specifically from a product of the previous state variables and complement signals of the previous state variables. The full flag is generated using digital logic decoding techniques that manipulate inputs from the three next state variables, a read clock signal and a write clock signal and a look-ahead decoded internal full flag signal. An empty flag can be generated by switching the read and write clock inputs and changing the look-ahead decoded internal full flag to a look-ahead decoded internal empty flag. All of these features are realized without requiring any counters, adders or decoders in the speed path of the state machine.

37 Claims, 7 Drawing Sheets

U.S. PATENT DOCUMENTS

| | | |
|---|---|---|
| 4,864,543 | 9/1989 | Ward et al. . |
| 4,875,196 | 10/1989 | Spaderna et al. . |
| 4,888,739 | 12/1989 | Frederick et al. . |
| 4,891,788 | 1/1990 | Kreifels . |
| 4,942,553 | 7/1990 | Dalrymple et al. . |
| 4,985,867 | 1/1991 | Ishii et al. . |
| 5,021,994 | 6/1991 | Tai et al. . |
| 5,079,693 | 1/1992 | Miller . |
| 5,084,837 | 1/1992 | Matsumoto et al. . |
| 5,088,061 | 2/1992 | Golnabi et al. . |
| 5,121,346 | 6/1992 | McClure . |
| 5,220,529 | 6/1993 | Kohiyama et al. . |
| 5,222,047 | 6/1993 | Matsuda et al. . |
| 5,228,002 | 7/1993 | Huang . |
| 5,262,996 | 11/1993 | Shiue . |
| 5,265,063 | 11/1993 | Kogure . |
| 5,274,600 | 12/1993 | Ward et al. . |
| 5,278,956 | 1/1994 | Thomsen et al. . |
| 5,305,253 | 4/1994 | Ward . |
| 5,311,475 | 5/1994 | Huang . |
| 5,315,184 | 5/1994 | Benhamida . |
| 5,317,756 | 5/1994 | Komatsu et al. . |
| 5,325,487 | 6/1994 | Au et al. . |
| 5,336,938 | 8/1994 | Sywyk . |
| 5,345,419 | 9/1994 | Fenstermaker et al. . |
| 5,365,485 | 11/1994 | Ward et al. . |
| 5,367,486 | 11/1994 | Mori et al. . |
| 5,375,092 | 12/1994 | Taniguchi et al. . |
| 5,381,126 | 1/1995 | McClure . |
| 5,384,744 | 1/1995 | Lee . |
| 5,404,332 | 4/1995 | Sato et al. . |
| 5,406,273 | 4/1995 | Nishida et al. . |
| 5,406,554 | 4/1995 | Parry . |
| 5,412,611 | 5/1995 | Hattori et al. . |
| 5,426,612 | 6/1995 | Ichige et al. . |
| 5,467,319 | 11/1995 | Nusinov et al. . |
| 5,471,583 | 11/1995 | Au et al. . |
| 5,473,756 | 12/1995 | Traylor . |
| 5,487,049 | 1/1996 | Hang . |
| 5,490,257 | 2/1996 | Hoberman et al. . |
| 5,495,451 | 2/1996 | Cho . |
| 5,502,655 | 3/1996 | McClure . |
| 5,506,809 | 4/1996 | Csoppenszky et al. . |
| 5,506,815 | 4/1996 | Hsieh et al. . |
| 5,508,679 | 4/1996 | McClure . |
| 5,513,318 | 4/1996 | van de Goor et al. . |
| 5,515,330 | 5/1996 | Hattori et al. . |
| 5,519,701 | 5/1996 | Colmant et al. . |
| 5,521,876 | 5/1996 | Hattori et al. . |
| 5,528,553 | 6/1996 | Saxena . |
| 5,546,347 | 8/1996 | Ko et al. . |
| 5,557,575 | 9/1996 | Lee . |
| 5,587,962 | 12/1996 | Hashimoto et al. . |
| 5,619,681 | 4/1997 | Benhamida et al. . |
| 5,623,449 | 4/1997 | Fischer et al. . |
| 5,625,842 | 4/1997 | Dalrymple . |
| 5,627,797 | 5/1997 | Hawkins et al. . |
| 5,636,176 | 6/1997 | Hashimoto et al. . |
| 5,642,318 | 6/1997 | Knaack et al. . |

OTHER PUBLICATIONS

T. Jackson, Parity–Generate and Parity–Check Features for High–Bandwidth–Computing FIFO Applications, Mar. 1996, pp. 1–3, 5–8.

T. Ishii et al., High–Speed, High–Drive SN74ABT7819 FIFO, Mar. 1996, pp. 1–3, 5–12.

C. Wellheuser et al., Internetworking the SN74ABT3614, Mar. 1996, pp. 1–3, 5–21.

C. Wellheuser, Metastability Performance of Clocked FIFOs, 1996, pp. 1–3, 5–12.

High Speed CMOS 256 x 36 x 2 Bi–direction FIFO, QS725420A, MDSF–00018–01, Apr. 24, 1995, pp. 1–36.

High–Speed CMOS 4K x 9 Clocked FIFO with Output Enable, QS7244A, MDSF–00008–05, Jun. 6, 1995, pp. 1–12.

High–Speed CMOS 1K X 36 Clocked FIFO with Bus Sizing, QS723620, MDSF–00020–00, Jul. 17, 1995, pp. 1–36.

Cypress Preliminary CY7C4425/4205/4215/CY7C4225/4235/4245 64, 256,512, 1K, 2K, 4K x 18 Synchronous FIFOS, pp. 5–67–5–82.

STATE MACHINE DESIGN FOR GENERATING EMPTY AND FULL FLAGS IN AN ASYNCHRONOUS FIFO

This is a continuation of U.S. patent application Ser. No. 08/567,893, filed on Dec. 6, 1995, now U.S. Pat. No. 5,712,992.

FIELD OF THE INVENTION

This invention relates to FIFO buffers generally, and more particularly to a state machine for generating either an empty or a full flag indication when an asynchronous FIFO buffer is either empty or full.

BACKGROUND OF THE INVENTION

It is well known to construct an asynchronous first-in first out FIFO buffer using counters, adders, and combinatorial logic to generate a so-called full flag for indicating when the FIFO is full. Another way to generate a full flag is by directly decoding the input counters with combinatorial logic. Both of these methods have long flag delays because the amount of circuitry between the input clocks and the output flag. To overcome the long flag delays associated with the combinatorial decode methods some form of look-ahead technique is employed. In the past this look-ahead technique has been done with a look-ahead decode path for generating a full-1 status flag, and latches and filters near the output to provide the actual full flag. This look-ahead technique provides reduced delay in generating the full flag, but has suffered in the past from metastability problems introduced because of the latches that are trying to sample the asynchronous full-1 flag based on some combination of the asynchronous read and write clocks.

In a typical counter/adder decode method there are two counters, one for each the read and write clocks. These two counters are reset to zero upon master reset and are incremented based only on their respective clocks. The outputs of the read and write counters are fed into a subtractor that calculates the difference between the number of locations written and the the number of locations read. This difference is then fed into combinatorial logic to determine if the FIFO is full. The combinatorial logic output is then used to drive the output flag.

Another method, called the direct decode method, uses the counters similar to the counters used in the counter/adder method. Instead of having a subtractor on the outputs, combinatorial logic is used to decode when the FIFO is full. This is done by taking the exclusive-OR (XOR) of the write and read counters. This combinatorial logic can be realized by generating a truth table for the full flag with respect to the write and read counters input variables. While the direct decode method reduces the amount of logic required to generate a full status flag and improves the speed of generating the full status flag as compared with the counter adder method, the direct decode method continues to have flag delays in the magnitude of 15–30 ns.

SUMMARY OF THE INVENTION

The present invention provides a state machine design for generating a full flag indicating when a FIFO is full or an empty flag indicating when the FIFO is empty. The state machine can be used to realize extremely short flag generation delays while solving all of the asynchronous problems associated with the prior art techniques. In addition to these performance enhancements, the present invention also realizes the benefit of having a MTBF in the order of e to the 11th to e to the 25th years and can be implemented independently of the size of the FIFO. The present invention generates a set of next state variables that are derived generally from a combination of three previous state variables and three additional inputs representing an internally generated look-ahead flag, an external write clock and an external read clock. The next state variables are derived specifically from a product of the previous state variables and complement signals of the previous state variables. The full flag is generated using digital logic decoding techniques that manipulate inputs from the three next state variables, a read clock signal, a write clock signal and a look-ahead decoded internal full flag signal. Alternatively, an empty flag can be generated by switching the read and write clock inputs and changing the look-ahead decoded internal full flag to a look-ahead decoded internal empty flag. All of these features are realized without requiring any counters, adders or decoders in the speed path of the state machine.

Objects, features and advantages of the present invention are to provide a state machine that generates an empty or full flag for use with an asynchronous FIFO. The state machine has very short flag delays, a very high MTBF, can effectively manipulate multiple input changes, requires minimum circuit design and simulation, does not require latches or mono-shots, can be easily ported to other design technologies, and can be implemented independently of the size of the FIFO.

BRIEF DESCRIPTION OF THE DRAWINGS

These and other objects, features and advantages of the present invention will be apparent from the following detailed description, the appended claims and the accompanying drawings in which:

DETAILED DESCRIPTION OF THE PREFERRED EMBODIMENT

Figure 1:
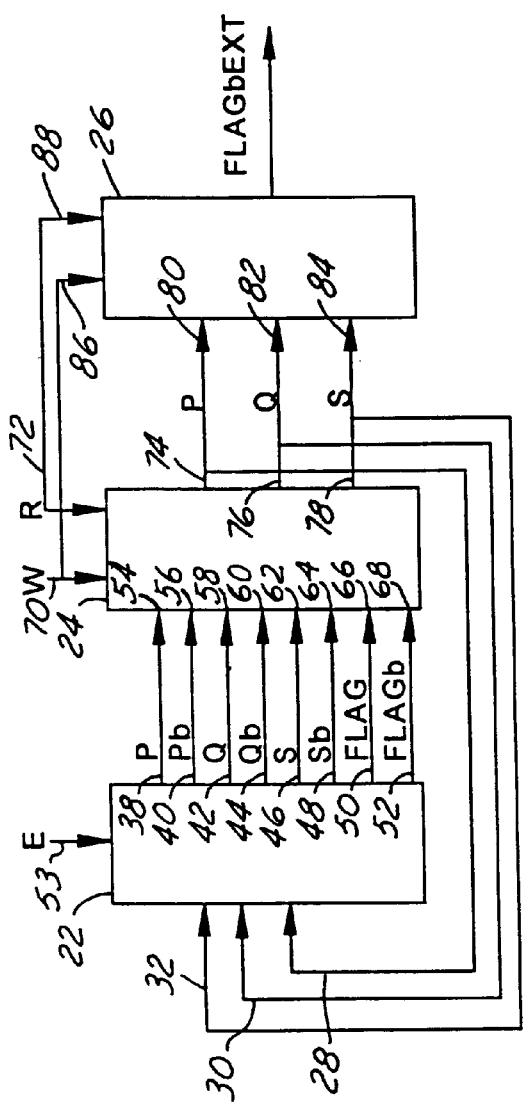
FIG. 1 is a conceptual block diagram representing the overall architecture of a state machine in accordance with a presently preferred embodiment of the invention.

Referring to FIG. 1, a conceptual block diagram of a state machine 20 is shown in accordance with a presently preferred embodiment of the invention. FIG. 1 provides a general overview of the functioning of the state machine 20. The detailed workings of the various components are shown in FIGS. 2–7. The state machine 20 generally comprises a signal generator 22, a product generator 24, and a flag decoder 26. The signal generator 22 receives a first input 28, a second input 30 and a third input 32. The first, second and third inputs 28, 30 and 32 correspond to the state variables P, Q, S of the state machine 20. The state variables P, Q and S together represent eight possible states of the FIFO. That is, since each state variable is a digital valve (0 or 1), the three variables in combination can represent two to the third, or eight, possible states.

The signal generator 22 has eight outputs 38, 40, 42, 44, 46, 48, 50 and 52. The output 38 represents an unprocessed signal that is equivalent to the state variable P present at the first input 28. The output 40 represents a digital complement Pb of the signal present at the output 38. Similarly, the output 42 represents an unprocessed signal that is equivalent to the state variable Q present at the second input 30. The output 44 represents a digital complement Qb of the signal present at the output 42. The output 46 represents an unprocessed signal that is equivalent to the state variable S present at the third input 32. The output 48 represents a digital complement Sb of the signal present at the output 46. The output 50 represents an unprocessed signal that is equivalent to a look-ahead full flag signal E present at a flag input 53. The output 52 represents a digital complement (FLAGb) to the signal present at the output 50. The look-ahead full flag signal E is generated externally from the state machine 20, but internally to the FIFO generally.

The function of the signal generator 22 is to generate equivalent and complement signals of the state variables P, Q and S. The signal generator 22 also provides an equivalent and complement signal FLAG and FLAGb. The signals produced by the signal generator 22 are used by the product generator 24 to produce a set of next state variables P', Q' and S' that will be manipulated by the product generator 24.

The product generator 24 has eight inputs 54, 56, 58, 60, 62, 64, 66, 68 that are respectively connected to the outputs 38–52 of the signal generator 22. The product generator has a write clock input 70 that receives an external write signal W. The product generator 24 also has a read clock input 72 that receives an external read clock signal R. The product generator 24 processes these inputs 54–72, and provides three outputs 74, 76 and 78 that represent the state variables P, Q and S of the state machine 20.

The flag decoder 26 has inputs 80, 82 and 84 that are respectively connected to the outputs 74, 76 and 78 of the product generator 24. The flag decoder 26 also has a write clock input 86 that receives the external write signal W, as well as a read clock input 88 that receives the external read signal R. The flag decoder 26 uses digital logic to produce an empty flag output signal Flagbext by manipulating the state variables presented at the inputs 80, 82 and 84, as well as the signals presented at the read and write clock inputs 86 and 88.

Figure 2:
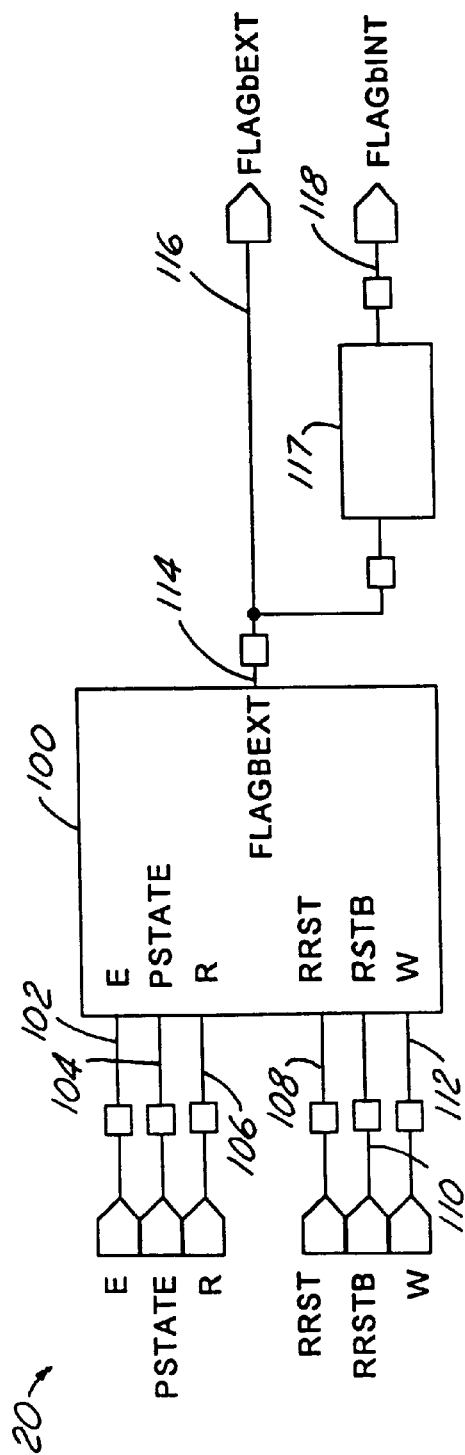
FIG. 2 is a block diagram illustrating the general structure of the state machine of FIG. 1.

Referring to FIG. 2, a block diagram of the state machine 20 is shown. A logic block 100 is shown having six input lines 102–112. The input line 102 receives the look-ahead full flag E. The input line 104 is connected to a preset state variable Pstate of the state machine 20. The input line 106 receives the external read clock R. The input line 108 receives an input Rrst that is a logical NAND of an external reset signal Rstb (active low) and a retransmit signal Rtb (active low). The input line 110 receives the external reset signal Rstb (active low). The input 112 receives an external write signal W. The logic block 100 has a single output line 114 that presents a full flag signal (Flagbext). The output line 114 is connected to the output line 116 that presents an external full flag signal Flagbext. The Flagbext is decoded from the state variables P, Q and S, and is ON when the FIFO buffer is full. The output line 114 is also connected to an internal flag generator block 117 that produces an output line 118 that represents an internal full flag signal (Flagbint). The Flagbint signal is a delayed signal that is equivalent to the Flagbext signal and is used to control the blocking of the internal clock generation logic (read clock in the case of empty flag and the write clock in the case of the full flag).

Figure 3A:
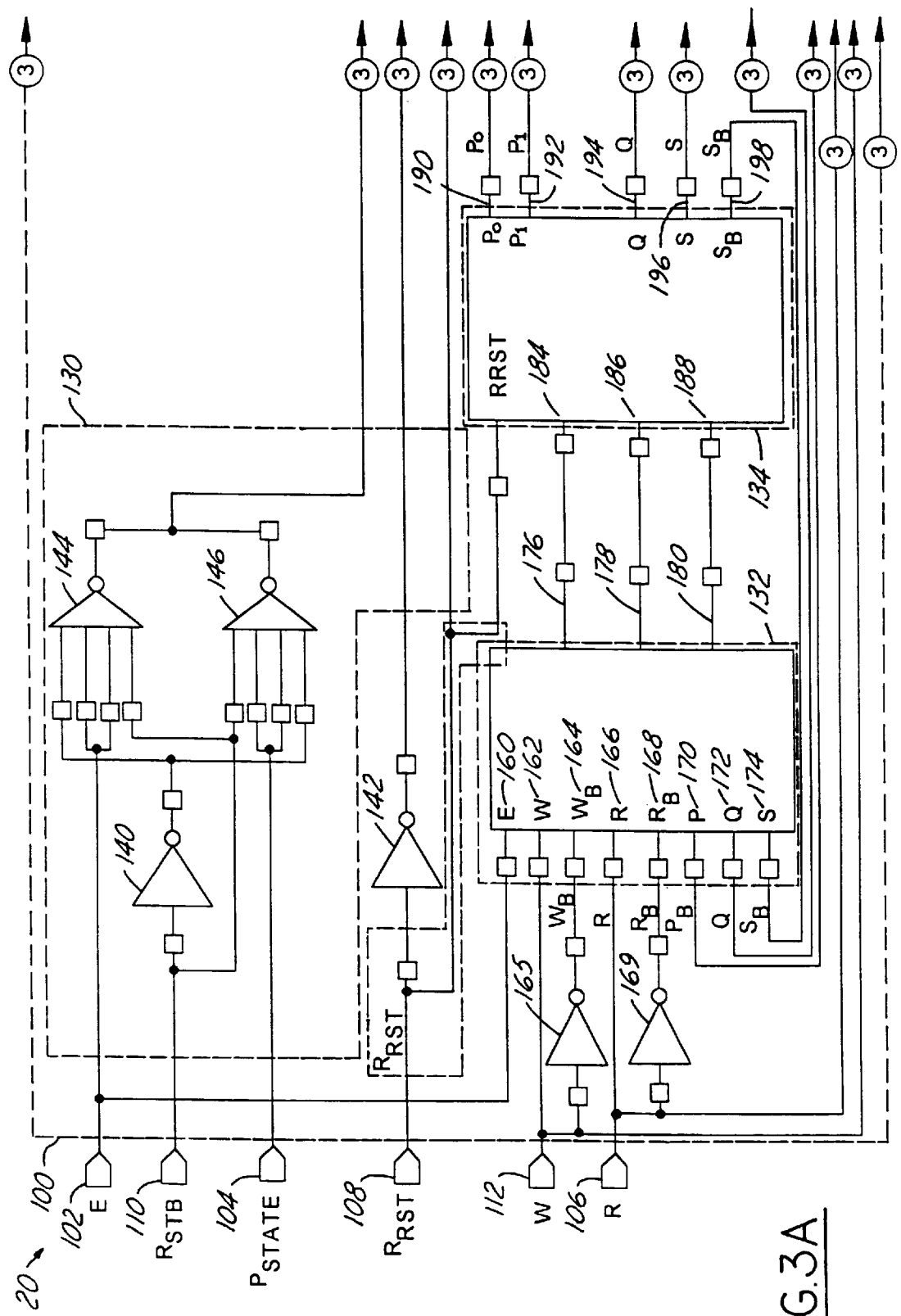
FIGS. 3A and 3B are schematic diagrams of the various components of the state machine of FIG. 1.
Figure 3B:
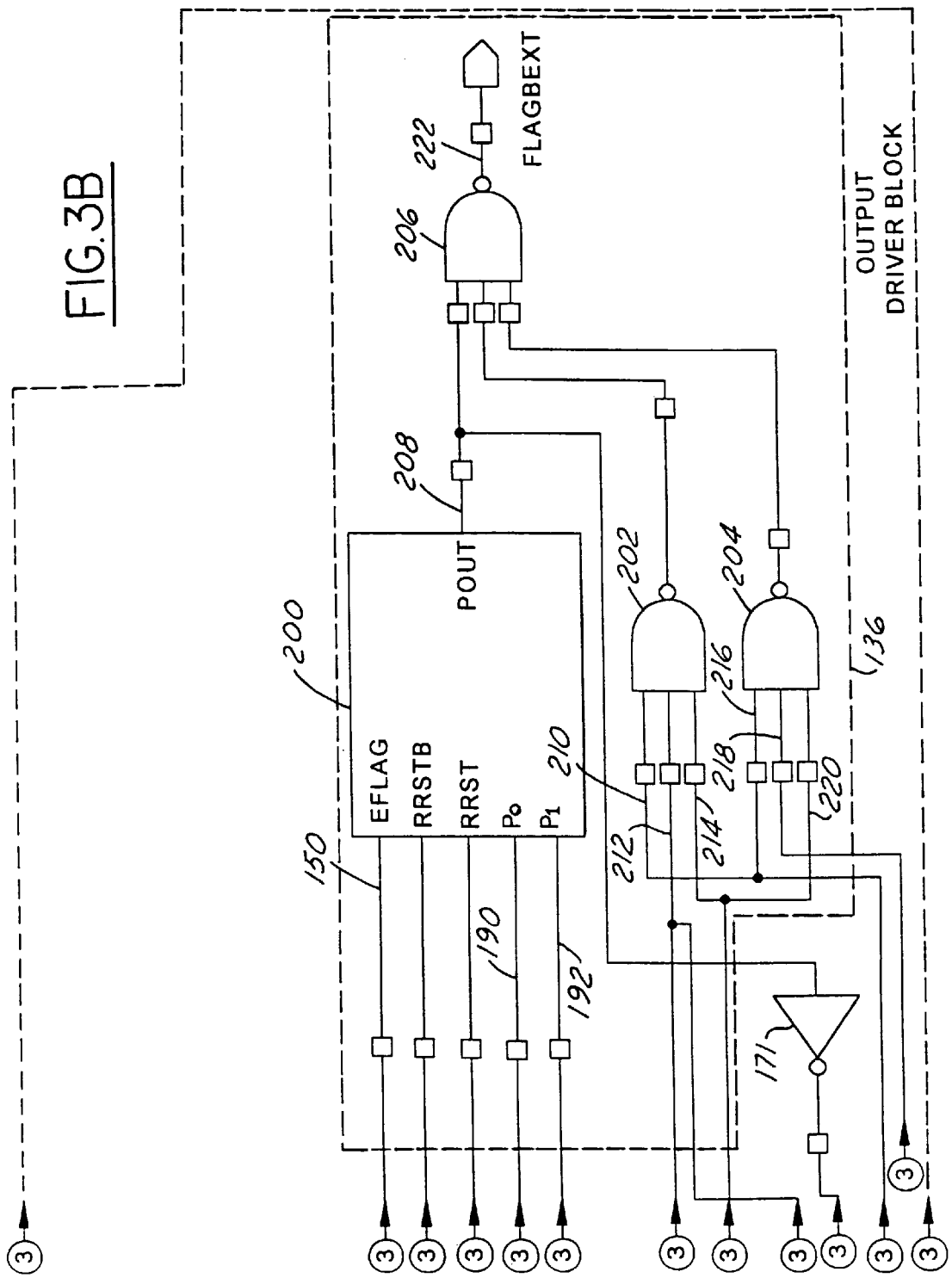

Referring to FIGS. 3A and 3B, more detailed schematic diagrams of the state machine 20 are shown. A logic block 100 is shown comprising a reset processing block 130, a front end product generation block 132, a back end product generation block 134 and an output driver block 136. The reset processing block 130 has an input 102 representing the look-ahead full flag E, a Pstate input 104 representing the preset state of the state machine 20, an input 106 representing the signal Rrst, and an Rstb input 110 representing an external reset. The reset processing block 130 comprises a first inverter 140, a second inverter 142, a first enabled inverter 144 and a second enabled inverter 146. The Rstb input 110 is coupled to the first inverter 140, which is in turn coupled to a p-enable input of the first enabled inverter 144 and to a n-enable input of the second enabled inverter 146. The Rstb input 110 is also coupled directly to the n-enable input of the first enabled inverter 144 and a p-enabled input of the second enabled inverter 146. The input 102 is coupled to the inversion transistors of the first enabled inverter 144. The input 102 is also coupled to the front end product generation block 132. The Pstate input 104 is coupled to the inversion transistors of the second enabled inverter 146. The first enabled inverter 144 and the second enabled inverter 146 have outputs that are coupled together to form an output 150. The Rrst input 106 is coupled to the second inverter 142, the back end product generation block 144, and the output driver block 136. The second inverter 142 is also coupled to the output driver block 136.

During a reset and re-transmit the W and R clock inputs to the state machine 20 are expected to be high. Similarly, during a re-transmit the look-ahead full flag input E to the state machine 20 is expected to be a non-look-ahead flag. This can be achieved by manipulating the LSB bit logic in the decode logic which generates the look-ahead full flag input E. The output 150 of the reset processing block 130 is coupled to the output driver block 136 and resets the state machine 20 to a predetermined state. The Pstate input 104 determines the mode the state machine 20 will be forced into during a master reset. Depending on the desired output of the state machine 20 (empty flag or full flag), the Pstate input 104 can be coupled to either a voltage source or to a ground. If the Pstate input 104 is coupled to a voltage source, a full flag will be generated at the output 222 of the state machine 20. If the Pstate input 104 is coupled to a ground, an empty flag will be generated. After a master reset is initiated, the output 222 starts as a digital low if the state machine 20 is generating an empty flag. The output 222 starts as a digital high if the state machine 20 is generating a full flag.

The front end product generation block 132 has a first input 160 coupled to the reset processing block 130. The first input 160 represents the look-ahead full flag E. A second input 162 is coupled to the external write signal W. A third input 164 is coupled to the external write signal W through an inverter 165 and represents a digital complement to the second input 162. A fourth input 166 is coupled to the external read signal R. A fifth input 168 is coupled to the external read signal R through an inverter 169. The fifth input 168 represents a digital complement of the fourth input 166. A sixth input 170 is coupled to the output driver block 136 through an inverter 171. The sixth input 170 represents the state variable P. A seventh input 172 is coupled directly to the output driver block 136 and represents the state variable Q. An eighth input 174 is coupled to the back end product generation block 134 and represents the state variable S. The state variables P, Q and S represent the present state of the state machine 20. The state variables P, Q and S are used in combination with the other inputs of the front end product generation block 132 to compute, through discrete digital logic, a set of next state variables P', Q' and S'. The front end product generation block 132 has three output buses 176, 178, and 180 that represent the result of this digital manipulation and provide the product terms for the generation of the next state variables P', Q' and S'.

The back end product generation block 134 has a first input 182 that is coupled to the reset input 106, a second input 184 that is coupled to the P' output bus 176 of the front end product generation block 132, a third input 186 that is coupled to the Q' output bus 178 of the front end product generation block 132 and a fourth input 188 is coupled to the S' output bus 180 of the front end product generation block 132. Each of the output buses 176, 178 and 180 are multi-bit buses that each present a multi-bit word to the back end generation logic 134 which is described in more detail with respect to FIG. 4 and FIG. 6. The back end product generation block 134 has outputs 190 and 192 that represent the state variable P. The outputs 190 and 192 are coupled to the output driver block 136. A third output 194 represents the state variable Q, while a fourth output 196 represents the state variable S. A fifth output 198 represents a digital complement Sb of the state variable S. The third output 194 and the fourth output 196 are both coupled to the output driver block 136.

The output driver block 136 comprises a logic block 200, a first NOR gate 202, a second NOR gate 204 and a third NOR gate 206. The logic block 200, along with the front end product generation block 132 and the back end product generation block 134 may, in one example, represent the product generator 24 of FIG. 1. In one example, the output driver block 136, with the exception of the logic block 200, may represent the flag decoder 26 of FIG. 1. The logic block 200 has inputs from the first reset block output 150, the second inverter 142, the reset input 106, the output 190, and the output 192. The logic block 200 processes these inputs and creates an output 208 which represents the state variable P of the state machine 20. The output 208 is coupled to the NAND gate 206 as well as the inverter 171. The NAND gate 202 has three inputs 210, 212 and 214. The input 210 is coupled to the reset input 106. The input 212 is connected to the Q output 194 of the back end product generation block 134. Additionally, the inputs 210 and 212 are also coupled together. The input 212 is coupled to the S output 196 of the back end product generation block 134. The output of the NAND gate 202 is coupled to the NAND gate 206. The NAND gate 204 has a first input 216 that is coupled to the reset input 106. The NAND gate 204 also has an input 218 that is coupled to the write input clock 112. The inputs 216 and 218 are also coupled together. The NAND gate 204 also has an input 220 which is coupled to the S output 196 of the back end product generation block 134. The NAND gate 204 has an output that is coupled to NAND gate 206. The NAND gate 206 has an output that represents the external full flag signal of the state machine 20.

Figure 4:
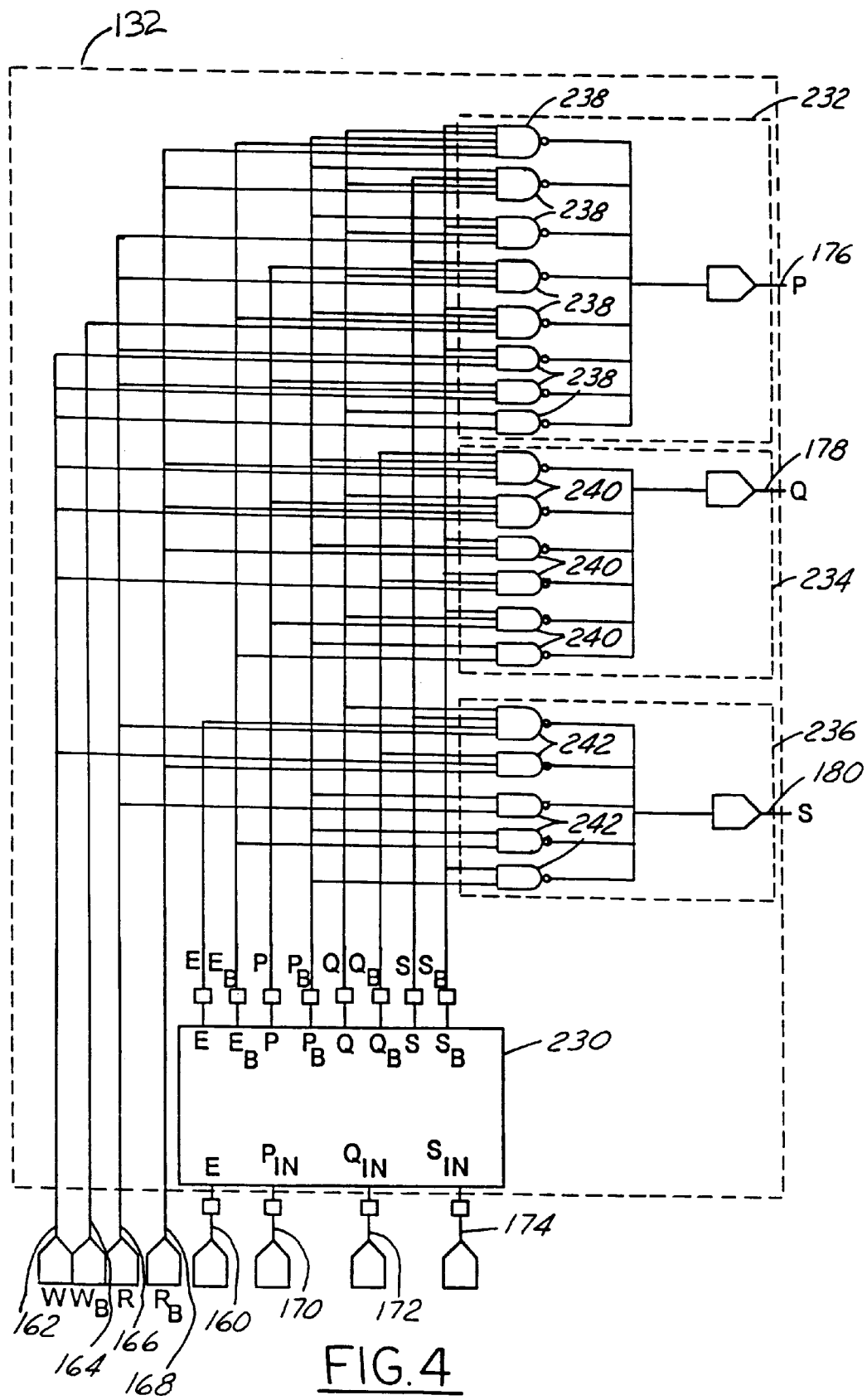
FIG. 4 is a schematic diagram of a front end of a product generation logic.

Referring to FIG. 4, the front end product generation block 132 is shown in greater detail as comprising a signal generation block 230, a P decoder block 232, a Q decoder block 234 and an S decoder block 236. The signal generation block 230 has inputs 160–174 as shown in FIG. 3. In one example, the signal generation block 230 may represent the signal generator 22 of FIG. 1. The signal generation block 230 provides outputs that represent the state variables P, Q and S, digital complements to the state variables Pb, Qb, Sb and the look-ahead full flag signal E, as well as an internal look-ahead full flag complement Eb. The P decode logic block 232 has eight NAND gates 238. The Q decode block 234 has six NAND gates 240. Similarly, the S decode block 236 has five NAND gates 242. The external write signal W at the input of the front end product generation block 132 is fed to one of the NAND gates 242 of the S decode block 236, three of the NAND gates 240 of the Q decode block 234, and three of the NAND gates 238 of the P decode block 232. The complement write signal Wb is fed to one of the NAND gates 232 of the P decode block 232. The external read clock R is fed to two of the NAND gates 242 of the S decode block 236, and four of the NAND gates 238 of the P decode block 232. The complement read clock input Rb is fed to one of the NAND gates 242 of the S decode block 236, three of the NAND gates 240 of the Q decode block 234, and two of the NAND gates 238 of the P decode block 232. Other logic gates can be used to implement the function realized by the NAND gates 238, 240 and 242.

The NAND gates 238 of the P decode block 232 have two inputs from the look-ahead full flag complement Eb, two inputs from the state variable P, four inputs from the state variable complement Pb, five inputs from the state variable 13-Q, two inputs from the state variable S, and four inputs from the state variable complement Sb. The Q decode block 234 has one input from the look-ahead full flag complement Eb, two inputs from the state variable P, three inputs from the state variable complement Pb, two inputs from the state variable Q, two inputs from the state variable complement Qb, and three inputs from the state variable complement Sb. The S decode block 236 has one input from the look-ahead full flag E, one input from the look-ahead full flag complement Eb, three inputs from the state variable complement Pb, one input from the state variable Q, one input from the state variable complement Qb, one input from the state variable S, and one input from the state variable complement Sb.

The P decode block 232 ties the outputs from each of the NAND gates 238 together to form the bus output 176 that represents the state variable P. The Q decode block 234 ties each of the outputs from the NAND gates 240 together to form the bus 178 that represents the state variable Q. Similarly, the S decode block 236 ties all of the outputs from the NAND gates 242 together to form the bus output 180 that represents the state variable S. Since each of the decode blocks 232, 234, and 236 have multiple inputs from the various outputs of the signal generator block 230, it is necessary to insure that the signals E, P, Q and S, and their complements Eb, Pb, Qb, and Sb are never both in the active (low) digital state at the same time. This is accomplished through the inner logic gates of the signal generation block 230.

Figure 5:
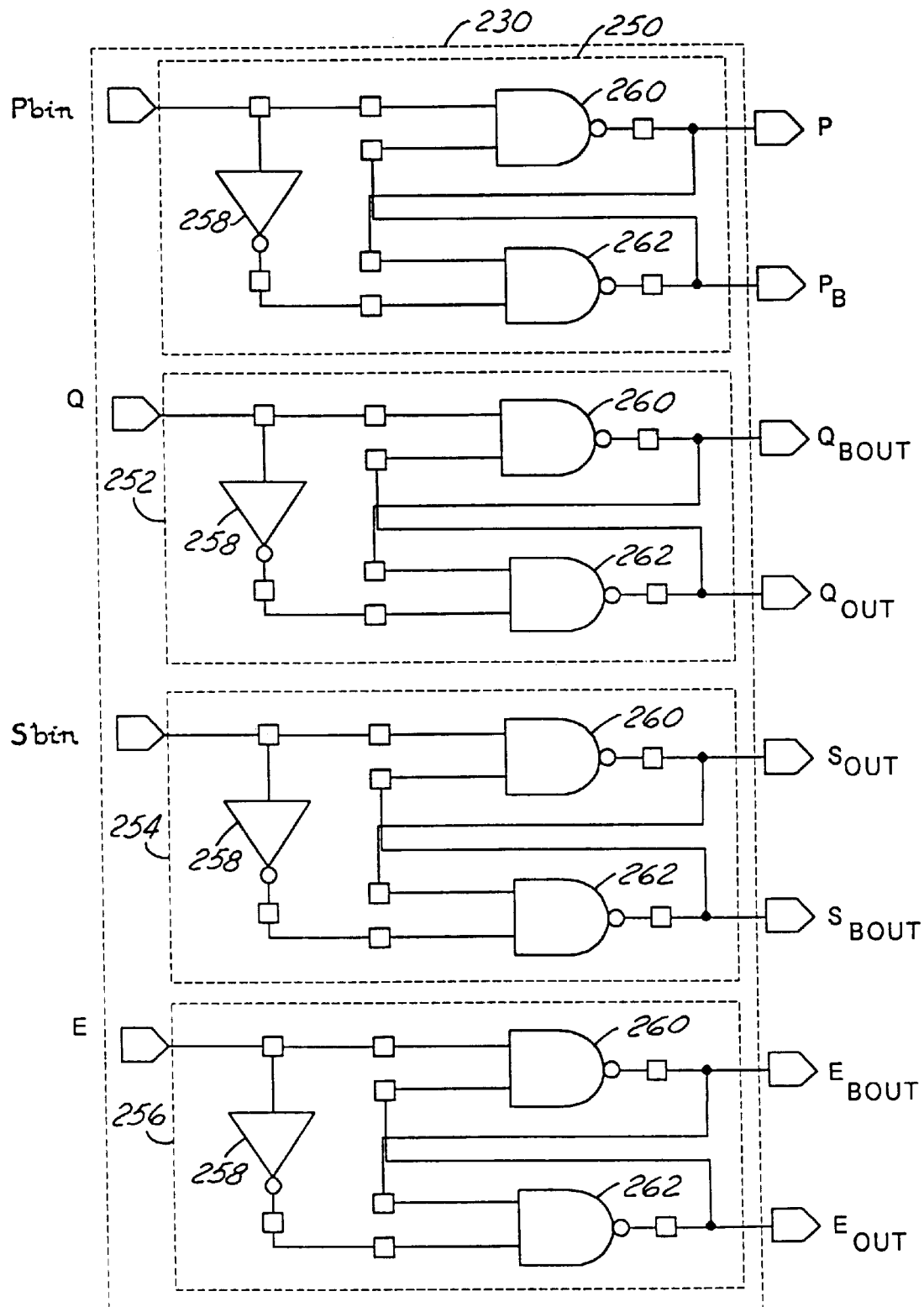
FIG. 5 is a schematic diagram representing logic for generating a true and complement signals.

Referring to FIG. 5, the signal generation block 230 is shown in greater detail comprising cross coupled gate blocks 250, 252, 254, and 256. The cross coupled gate block 250 is shown comprising an inverter 258, a NAND gate 260, and a NAND gate 262. An input signal Pbin is fed to the inverter 258 which in turn is fed to an input of the NAND gate 262. The signal Pbin is also fed to an input of the NAND gate 260. The output of the NAND gate 260 is fed to an input of the NAND gate 262. Similarly, the output of the NAND gate 262 is fed to an input of the NAND gate 260. The NAND gates 260 and 262 are in a cross coupled configuration that insures the true and complement signals are both never in the active digital state at the same time. The output of NAND gate 260 produces an output signal P, while the NAND gate 262 products an output Pb. The output signals Pout and Pbout are the internal state variables that provide inputs to the decode blocks 230, 234, and 236. The cross coupled gate blocks 250, 254, and 256 have similar internal components, connections and outputs to produce the true and complement signals for the variables Q and S as well as for the true and complement signals for the look-ahead full flag E.

Figure 6:
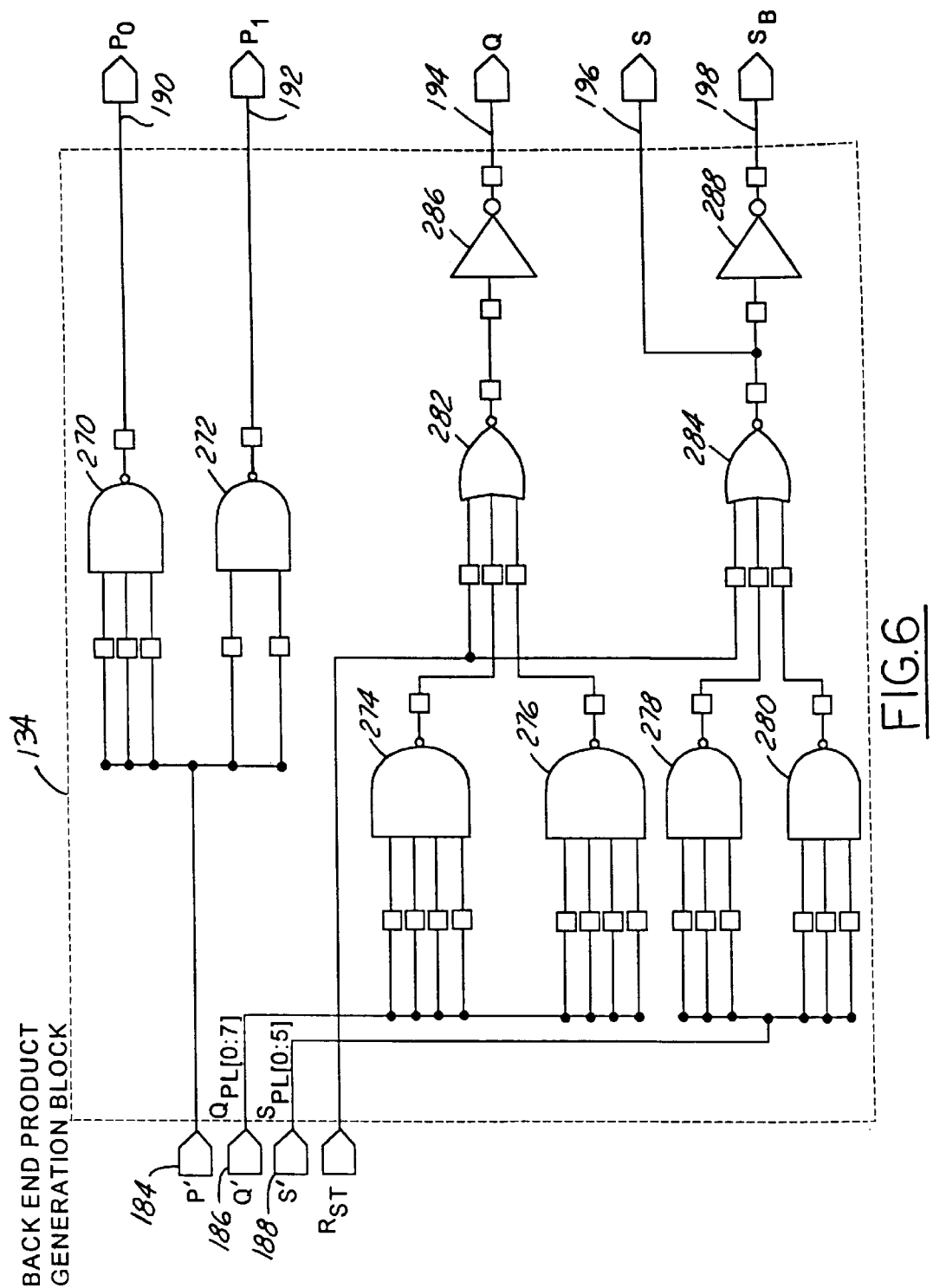
FIG. 6 is a schematic diagram of a back end of the product generation logic.

Referring to FIG. 6, the back end product generation block 134 is shown in greater detail comprising a first NAND gate 270, a second NAND gate 272, a third NAND gate 274, a fourth NAND gate 276, a fifth NAND gate 278, a sixth NAND gate 280, a first NOR gate 282, a second NOR gate 284, a first inverter 286 and a second inverter 288. The back end product generation block 134 has inputs 184, 186 and 188 from the output buses 176, 178 and 180 of the front end product generation block 132 that represent the three state variables P, Q and S. A fourth input is provided that represents the reset input Rst (106 in FIG. 3). The internal bits of the P input are fed to three inputs of the first NAND gate 270 as well as to two inputs of the second NAND gate 272. The first NAND gate 270 provides an output P0 (190 in FIG. 3), while the second NAND gate 272 provides an output P1 (192 in FIG. 3). The internal bits of the Q input are fed to four inputs of the third NAND gate 274, as well as to four inputs of the fourth NAND gate 276. The outputs of the NAND gates 274 and 276 are fed to inputs of the first NOR gate 282. The internal bits of the S input are fed to three inputs of the NAND gate 278, as well as to three inputs of the NAND gate 280. The outputs of the NAND gates 278 and 280 are fed to inputs of the second NOR gate 284. The reset input Rst is fed to both the first and second NOR gates 282 and 284. The output of the first NOR gate 282 is fed through inverter 286 to provide the state variable Q (output 194 in FIG. 3). An output from the second NOR gate 284 provides an output representing the state variable S (output 196 in FIG. 3). The output from the NOR gate 284 is also fed through inverter 288 to provide an output that represents a digital complement to the state variable Sb (output 198 in FIG. 3).

The state machine 20 is generally designed to function with clock signals having a 10 ns high time and a 5 ns low time. However, the state machine 20 will work with a clock as degraded as a 5 ns low time and a 5 ns high time.

Figure 7:
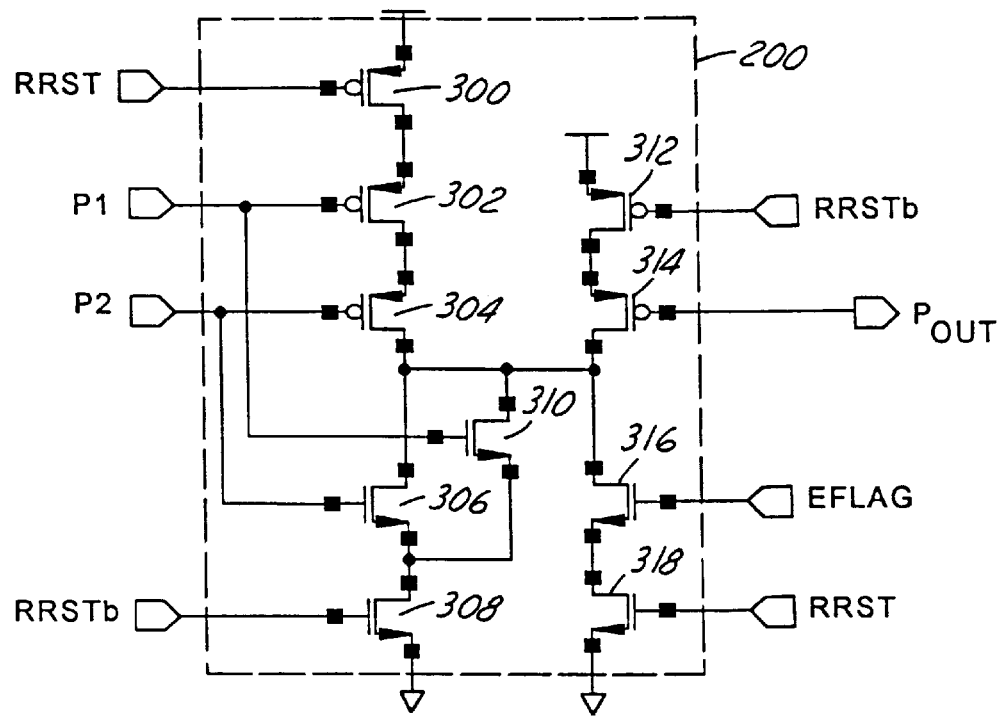
FIG. 7 is a schematic diagram of a portion of the product generation logic.

Referring to FIG. 7, the internal logic of the logic block 200 (FIG. 3) is shown in greater detail. A gate of a transistor 300 receives the input Rrst, a gate of a transistor 302 receives the input P1, a gate of a transistor 304 receives the input P0, a gate of a transistor 306 also receives the input P0 and a gate of a transistor 308 receives the input Rrstb. A gate of a transistor 310 also receives the input P1. The sources and drains of the transistors 300, 302, 304, 306 and 308 are cascaded together. The output Pout is coupled to the source of transistor 304 as well as the drain of a transistor 310. The logic block 200 also includes a transistor 312, a transistor 314, a transistor 316, and a transistor 318. The transistor 312 also receives the input Rrstb. The sources and drains of the transistors 312, 314, 316 and 318 are cascaded together. A drain of the transistor 314 also generates the Pout output (208 in FIG. 3) of the logic block 200. A gate of the transistor 316 and the transistor 316 each receive the Eflag input to the logic block 200. A gate transistor 318 receives the Rrst input of the logic block 200.

Figure 8:
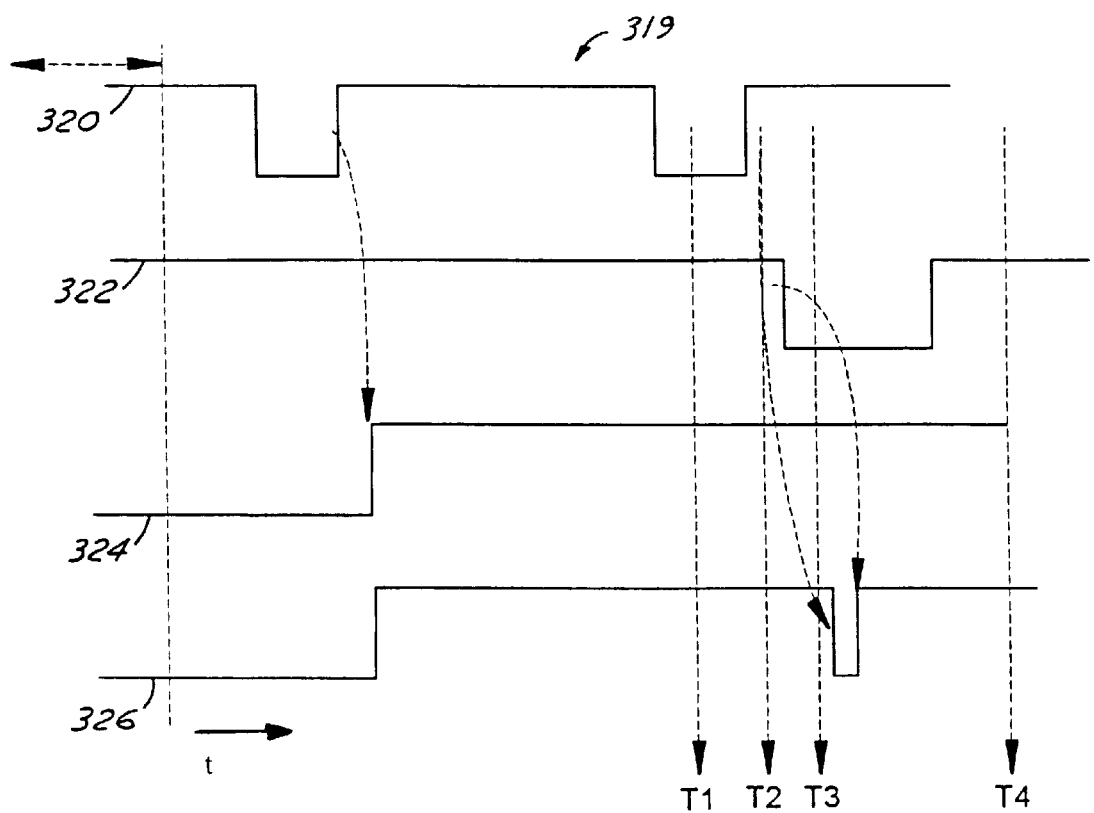
FIG. 8 is a timing diagram illustrating several typical state transitions.

Referring to FIG. 8, a timing diagram 319 of the state machine 20 is shown. The diagram 319 represents the state machine 20 after receiving two write signals W and then a read signal R. Four transition times are represented as T1, T2, T3 and T4. A first timing wave 320 is shown representing the write signal W (162 in FIGS. 3 and 4), a second timing wave 322 is shown representing the read signal R (166 in FIGS. 3 and 4), a third timing signal 324 is shown representing the external full flag signal Flagbext and a fourth timing signal 326 is shown representing the look-ahead full flag E (input 160 in FIGS. 3 and 4).

The following Table 1 is a flow table or state diagram that illustrates the operation of state machine 20:

TABLE 1

| Row # | 000 | 001 | 011 | 010 | 110 | 111 | 101 | 100 | EF |
|---|---|---|---|---|---|---|---|---|---|
| 8  | ░   | —   | —   | —   | —   | —   | —   | —   | 1 |
| 9  | —   | ░   | —   | —   | —   | —   | —   | —   | 1 |
| 10 | —   | —   | ░   | 27* | 28  | 21* | —   | —   | 1 |
| 11 | —   | —   | —   | ░   | —   | —   | —   | —   | 1 |
| 12 | —   | —   | —   | —   | ░   | —   | —   | —   | 1 |
| 13 | 16  | 17  | 18* | 19  | |20*←| ░   | —*  | —   | 1 |
| 14 | —   | —   | —   | —   | |—  | ↑—  | ░   | —   | 1 |
| 15 | —   | —   | —   | —   | |—  | |—  | —   | ░   | 1 |
| 16 | ░   | 17* | 18  | 19* | |20 | |21 | 22  | 23* | 1 |
| 17 | 16* | ░   | 18* | 19  | |20 | |21 | 22* | 23  | 1 |
| 18 | 16  | 17* | ░   | 19* | |20 | |21*| 22  | 23  | 1 |
| 19 | 16* | 17  | 18  | ░   | ↓20*| |21 | 22  | 23  | 1 |
| 20 | 16  | 17  | 18  | 19* | ░   | |21*| 22  | 23* | 1 |
| 21 | —   | —   | 18* | 19  | 28* | ░   | 22* | 31* | 1 |
| 22 | —   | —   | —   | —   | 20  | |13*←| ░  | 31* | 1 |
| 23 | 16* | 17  | 18  | 19  | 20* | 21  | 22* | ░   | 1 |
| 24 | ░   | 25* | 10  | 19* | —   | —   | —   | —   | 0 |
| 25 | 24* | ░   | 10* | —   | —   | —   | —   | —   | 0 |
| 26 | —   | 25* | ░   | —   | —   | 29  | —   | —   | 0 |
| 27 | 24* | 25  | 26* | ░   | 28* | 29  | —   | 31  | 0 |
| 28 | 24  | 25  | —   | 27  | ░   | 29* | —   | 31  | 0 |
| 29 | —   | 25  | 26* | —   | —   | ░   | 30* | 31  | 0 |
| 30 | —   | 25* | —   | —   | —   | 21* | ░   | 31* | 0 |
| 31 | 24* | —   | —   | 10  | 20* | —   | —   | ░   | 0 |

The darkened boxes represent the 8 states of the state machine 8. The left column numbers represent the twenty-four stable states in sequence 8–31. The top row of Table 1 illustrates various possible combinations of three binary signals E, W and R. The last column EF represents the state of the external full flag signal Flagbext. Between each adjacent pairs of columns, one of these signals changes state. For example, column 000 represents the stable states (8, 16 and 24) when E, W and R are all 0. The next column illustrates the stable states (9, 17 and 25) when R changes from 0 to 1, and E and W remain 0. The next column illustrates the stable states (10, 18 and 26) when W then changes to 1, while R remains 1 and E remains zero.

The arrows inside the Table 1 represent transitions. At a time T1 (FIG. 8), the state machine is in a stable state box 22 (row 22, column 101, meaning that W is zero, R is 1 and E is 1 as shown in FIG. 8 at time T1). When the write signal complement W goes high at time T2, the state of the machine shifts to the left one column to row 22, column 111. This is a state that is not stable. Therefore, the state machine shifts to a stable state for that combination which is row 13, column 111. The transition between time T1 and time T2 represents the internal functioning of the state machine 20. A second transition occurs at time T3 when the read complement signal R goes low in FIG. 8. The state machine 20 initially transitions in row 13, column 110, and then drops to a stable state box at row 20, column 110. This represents a second successful transition of the state machine 20. At time T4 the read complement signal R goes high and the state machine 20 transitions to the right one column to row 20, column 111, and then adjusts to a stable state at row 21, column 111.

It should be appreciated that while the present invention has been described with respect to the look-ahead full flag E, the present invention includes using the state machine 20 with a look-ahead empty flag as well.

It is to be understood that modifications to the invention might occur to one with skill in the field of the invention within the scope of the appended claims.

We claim:

1. An apparatus comprising:
    a signal generator having a first set of inputs creating a digital word indicating the current state of a FIFO and a flag input representing a look-ahead flag, said signal generator manipulating said inputs to create (i) a first set of outputs representing the first set of inputs, (ii) a second set of outputs representing a digital complement to the first set of inputs, and (iii) a third set of outputs representing the flag input and a digital complement of the flag input;
    a product generator having a first set of inputs connected to the first, second and third set of outputs of the signal generator, said product generator manipulating said first set of inputs to produce a set of outputs representing the current state of the FIFO; and
    a flag decoder having a set of decoder inputs connected to the set of outputs of the product generator, said flag decoder manipulating the set of decoder inputs to create an output flag indicating the fullness of the FIFO, wherein said output flag is at one logic state when the FIFO is full and is at another logic state when the FIFO is not full.

2. The apparatus according to claim 1 wherein said product generator further comprises at least one pair of timing inputs connected to an external write clock and an external read clock, said product generator manipulating said timing inputs in combination with said first set of inputs and said flag input to produce said set of outputs.

3. The apparatus according to claim 1 wherein said flag decoder further comprises at least one pair of timing inputs connected to an external write clock and an external read clock, said flag decoder manipulating said first pair of inputs in combination with said decoder inputs to generate said output flag.

4. The apparatus according to claim 1 wherein said signal generator further comprises a set of cross-coupled gates connected between said first set of inputs and said first and second sets of outputs of said signal generator, wherein said set of cross-coupled gates are configured to ensure that said first set of outputs and said second set of outputs are not in the active digital state at the same time.

5. The apparatus according to claim 4 wherein each of said cross coupled gates comprises a first NAND gate and a second NAND gate, each of said NAND gates having a first and second input and an output, each of the first inputs of the first and second NAND gates connected to a signal from said first set of inputs of said signal generator, the output of said first NAND gate provides a signal to the first set of outputs of the signal generator and is coupled to the second input of the second NAND gate, the output of the second NAND gate provides a signal to the second set of outputs of the signal generator and is coupled to the second input of the first NAND gate.

6. The apparatus according to claim 5 wherein each of said cross coupled gates further comprises an inverter connected between said signal from said first set of inputs and said first input of said second NAND gate.

7. The apparatus according to claim 1 wherein said product generator further comprises an array of logic gates.

8. The apparatus according to claim 1 wherein said set of outputs representing the current state of the FIFO comprises a variable P, a variable Q and a variable S.

9. The apparatus according to claim 8 wherein said P, Q and S variables represent eight states of the FIFO.

10. The apparatus according to claim 9 wherein said flag decoder produces said output flag in response to the eight possible states of the FIFO.

11. An apparatus comprising:
    a front end product generator having a flag input representing a look-ahead flag, said front end product generator creating a set of outputs representing a current state of the FIFO;
    a back end product generator coupled to the outputs of said front end product generator, said back end product generator producing a set of outputs representing a portion of a next state of said FIFO; and
    an output driver coupled to the set of outputs of the back end product generator, said output driver producing an output flag indicating the fullness of the FIFO, wherein said output flag is at one logic state when the FIFO is full and is at another logic state when the FIFO is not full.

12. The apparatus according to claim 11 further comprising a reset circuit having a set of inputs representing an internally generated look-ahead flag, a reset input, and a preset state input, wherein said preset state input is reset to a first logic state when said FIFO is empty and to a second logic state when said FIFO is not empty, said reset circuit generating a reset output that is at a first logic state when said apparatus is in a master reset mode and is at a second logic state when said apparatus is in a retransmit mode.

13. The apparatus according to claim 12 wherein said output driver has a reset input connected to said reset output of said reset circuit, said apparatus being initialized when said reset output is in said second logic state.

14. The apparatus according to claim 11 wherein said front end product generator further comprises at least one pair of inputs connected to an external write clock and an external read clock, said front end product generator manipulates said first pair of timing inputs in combination with said set of inputs and said flag input to produce said set of outputs.

15. The apparatus according to claim 11 wherein said output driver further comprises a at least one pair of inputs connected to an external write clock and an external read clock, said output driver manipulates said first pair of inputs in combination with said set of inputs and said flag input to produce said output flag.

16. The apparatus according to claim 11 wherein said front end product generator further comprises a set of cross coupled gates for insuring that said first set of outputs and said second set of outputs are not in the same digital state at the same time.

17. The apparatus according to claim 11 wherein said set of outputs representing a portion of the current state of the FIFO comprise at least two binary logic signals.

18. The apparatus according to claim 17 wherein said flag decoder produces said output flag in response to the at least two binary logic signals.

19. The apparatus according to claim 18 wherein said output flag is produced in a predetermined fashion by an array of NAND gates.

20. An apparatus comprising:
    a signal generator circuit configured to generate a first set of outputs in response to (i) a first set of inputs indicating the current state of a FIFO and (ii) a look-ahead flag, wherein the first set of outputs corresponds to the first set of inputs, a digital complement of the first set of inputs, the flag input and a digital complement of the flag input;

a product generator configured to generate a second set of outputs in response to the first set of outputs, wherein said second set of outputs represents the current state of the FIFO; and a flag decoder configured to generate a status flag in response to the second set of outputs, wherein said status flag is at one logic state when the FIFO is full and is at another logic state when the FIFO is not full.

21. The apparatus according to claim 20 wherein said product generator generates said second set of outputs in further response to a first timing input connected to an external write clock and a second timing input connected to an external read clock.

22. The apparatus according to claim 20 wherein said flag decoder generates said status flag in further response to a first timing input connected to an external write clock and a second timing input connected to an external read clock.

23. The apparatus according to claim 20 wherein said signal generator comprises a set of cross-coupled gates connected between (i) said first set of inputs and (ii) a first subset of said set of outputs corresponding to the first set of inputs and a second subset of said set of outputs corresponding to said digital complement of the first set of inputs, wherein said set of cross-coupled gates prevent said first subset of said outputs and said second subset of said outputs from both being in an active state at the same time.

24. An apparatus for generating one or more status flags representing the status of a FIFO buffer comprising:

a state machine configured to generate said one or more status flags in response to (i) a write clock, (ii) a read clock, and (iii) a look-ahead signal.

25. The apparatus according to claim 24, wherein said one or more status flags comprises a full flag that is at one logic state when said FIFO is full and is at another logic state when said FIFO is not full.

26. The apparatus of claim 24, wherein said one or more status flags comprises an empty flag that is at one logic state when said FIFO is empty and is at another logic state when said FIFO is not empty.

27. The apparatus according to claim 24, wherein said state machine further responds to a set signal for determining whether said one or more status flags represents a full flag or an empty flag.

28. The apparatus according to claim 24, wherein said one or more status flags comprise an empty flag and a full flag.

29. The apparatus according to claim 24, further comprising said FIFO.

30. The apparatus according to claim 29 wherein said FIFO comprises an asynchronous FIFO.

31. The apparatus according to claim 24 wherein said look-ahead signal is a member selected from the group consisting of a read counter signal and a write counter signal.

32. The apparatus according to claim 24 wherein said read clock comprises an external read clock.

33. The apparatus according to claim 24 wherein said write clock comprises an external write clock.

34. The apparatus according to claim 24, wherein said state machine further responds to a reset signal configured to reset said FIFO.

35. The apparatus according to claim 24, wherein said state machine further responds to a retransmit signal configured to retransmit information from said FIFO.

36. A method for determining the fullness of a buffer comprising the steps of:

generating one or more status flags indicating the fullness of said buffer in response to (i) a write clock, (ii) a read clock and (iii) a look-ahead signal.

37. The method according to claim 36, further comprising the step of:

presenting said write clock, said read clock and said look-ahead signal to a state machine, wherein said state machine generates said one or more status flags.

* * * * *